Patented Dec. 5, 1950

2,532,575

UNITED STATES PATENT OFFICE 2,532,575

OXYBICYCLO(4.1.0.)HEPTA-2,4-DIENE-7-CARBOXYLIC ESTERS

Norman E. Searle, Wilmington, Del., assignor to E. I. du Pont de Nemours & Company, Wilmington, Del., a corporation of Delaware No Drawing. Application November 3, 1947, Serial No. 783,843

10 Claims. (Cl. 260—468)

This invention relates to new organic fused-ring compounds. More particularly, it relates to new, fused, carbocyclic oxy-compounds and to methods for their preparation.

An object of this invention is to provide new, fused, oxy-substituted, carbocyclic compounds. A further object is to provide new, fused, oxy-substituted, carbocyclic compounds containing as an essential structural feature an oxycyclohexadiene nucleus which is part of an oxycloclohepta-diene ring. Yet a further object is to provide a method of preparation for new, fused, oxy-substituted, carbocyclic compounds of this invention. A particular object is the provision of new insecticidal materials. Other objects will appear hereinafter.

These objects are accomplished by the production of new, fused, oxy-substituted, carbocyclic compounds in which one to three oxy-substituents are directly attached through oxygen atoms to annular carbon atoms of the four-carbon conjugated diene system of a cyclohexadiene ring, the remaining two carbon atoms of said cyclohexadiene ring, each bearing hydrogen, being common to a cyclopropane ring, the third carbon atom of the cyclopropane ring being directly attached to hydrogen and to a carboxyl group or derivatives thereof which on hydrolysis yield the carboxyl group.

Thus, that portion of the new compounds of the invention containing an oxycyclohexadiene ring may be represented by the structural formula

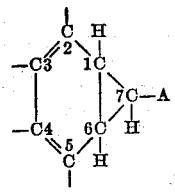

wherein the oxy-substituents are directly attached through oxygen at one to three of the positions designated as 2, 3, 4 and 5, and A is carboxyl and its derivatives which form carboxyl when subjected to hydrolyzing conditions. The oxy-substituents, OR, attached to the above cyclohexadiene ring consist of the hydroxyl group and alkoxy groups obtainable therefrom, R representing hydrogen and alkyl groups, preferably of from one to six carbon atoms. A is carboxyl and its derivatives which form carboxyl when subjected to hydrolyzing conditions. A can thus be (—COOH); (—COOR); (—COOOC—); (—CONH$_2$); (—CONHR); (—CONR$_2$); (—CN); (—COHal); (—COOM); wherein M is a metal, Hal is halogen and R is a saturated hydrocarbon radical. Any remaining valences of the annular carbon atoms of said cyclohexadiene ring can be bonded to hydrogen, halogen and monovalent hydrocarbon radicals, preferably alkyl of from one to six carbon atoms, and divalent hydrocarbon radicals wherein the two valences, preferably of a four-carbon conjugated diene radical, are joined to adjacent annular carbon atoms in positions 2, 3 or 4, 5 of said cyclohexadiene ring.

The new compounds of the invention are obtained by reacting a phenolic-oxy compound with a diazoacetic ester at a temperature between the range of 80° and 180° C., said phenolic-oxy compound consisting of benzenoid compounds containing 1 to 3 ring-attached hydroxyl groups and their alkyl ethers, and having, in such oxy-substituted aryl ring, at least two nuclear vicinal carbon atoms bearing hydrogen.

In a specific embodiment of the invention, 2 to 6 moles of an alkyl phenyl ether having at least two nuclear vicinal carbon atoms bearing hydrogen are reacted at a temperature between the range of 80° and 180° C. with a molal amount of an alkyl diazoacetic ester and the oxybicyclo-(4.1.0)hepta-2,4 - diene - 7 - carboxylic ester so formed is isolated by distillation.

The reaction is specifically illustrated with p-chloroanisole and ethyl diazoacetate:

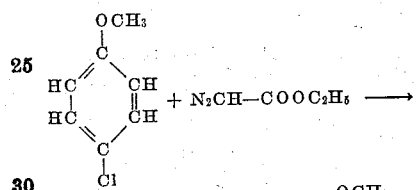

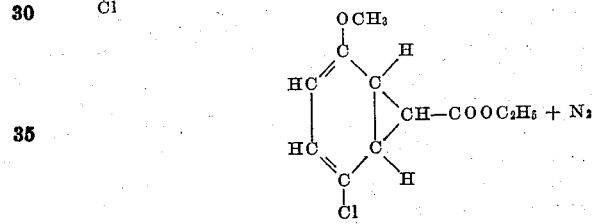

The following examples in which parts are by weight unless otherwise indicated illustrate the practice of the invention.

Example I

Forty-five and seven-tenths (45.7) parts (0.4 mole) of ethyl diazoacetate was diluted with an equimolar amount of phenol and slowly added to a mixture of 75.3 parts (0.8 mole) of phenol and 2 parts of copper bronze at 85° C. The rate of addition was regulated to control the temperature between 85 and 90° C. for 50 minutes, during which time nitrogen was evolved vigorously. With the cessation of nitrogen evolution at the completion of the addition, the mixture was heated at the above temperature for an additional five minutes. The reaction mixture was then diluted with an equal volume of methylene chloride and, after filtering off the copper bronze, was distilled through a short open column. Upon redistillation and fractionation from an 18" saddle-packed column, 20.6 parts (29% of the theoretical amount) of slightly yellow, fragrant, oily ethyl 3 hydroxybicyclo(4.1.0)hepta-2,4-diene-7-carboxylate distilling between 77° C./0.4 mm. and 82° C./0.5 mm. was obtained, refractive index $n_D^{25}$, 1.5019. This compound can be represented by the following formula:

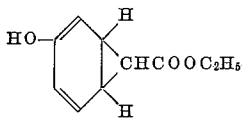

*Anal.*—Calc'd. for $C_{10}H_{13}O_3$: C, 66.70; H, 6.72. Found: C, 66.40; H, 6.70.

Example II

A mixture of 40 parts (0.35 mole) of ethyl diazoacetate and an equimolar amount of anisole was added dropwise to 151.5 parts (1.40 moles) of anisole previously heated to 154–5° C. Nitrogen was evolved almost immediately. After all of the ester had been added (about 1.25 hrs.), the reflux temperature was maintained for an additional hour until the evolution of nitrogen had ceased. The product was first distilled through an empty column and then redistilled through a 20″ column packed with Fenske rings The redistilled product consisted of 18.8 parts (27.6% of the theoretical amount) of yellow, oily ethyl 3-methoxybicyclo (4.1.0)hepta-2,4-diene-7-carboxylate boiling between 95–105° C./1.15–1.20 mm., with a refractive index of $n_D^{25}$ 1.5185. This compound can be represented by the following formula:

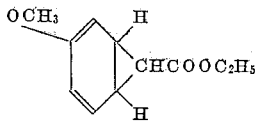

*Anal.*—Calc'd. for $C_{11}H_{14}O_3$: C, 68.0%; H, 7.27%. Found: C, 67.72%, 67.62%; H, 7.49%, 7.25%.

Example III

A solution of 28.5 parts (0.25 mole) of ethyl diazoacetate in 35.6 parts (0.25 mole) of p-chloroanisole was added with stirring to 35.6 parts (0.25 mole) of p-chloroanisole heated at 140° C. At this temperature the reaction became exothermic with the evolution of nitrogen and at about 156° C. the evolution of heat was sufficient to make the reaction self-propagating. The total reaction time was 1.5 hours, after which the evolution of nitrogen had ceased. There was thus obtained by this procedure 6.35 parts (11.1% of the theoretical amount) of ethyl 5-chloro-2-methoxybicyclo (4.1.0)hepta-2,4-diene-7-carboxylate. This product distilled between 108° C./0.55 mm. and 117° C./0.70 mm. This compound can be represented by the following formula:

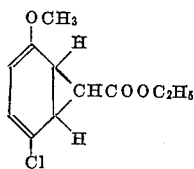

*Anal.*—Calc'd. for $C_{11}H_{13}ClO_3$: Cl, 15.52%. Found: Cl, 13.73%.

Example IV

A quarter of a mole of ethyl diazoacetate (28.5 parts) was diluted with 0.25 mole (34.5 parts) of meta-dimethoxybenzene and added slowly to 0.25 mole of meta-dimethoxybenzene previously heated to 140° C. Nitrogen was evolved immediately, and it was observed that the reaction was exothermic. However, it was not sufficiently exothermic to maintain the above temperature which was held between 140 and 146° C. by external heating during 37 minutes of addition time and for a subsequent period of 65 minutes, at the end of which time the nitrogen evolution had ceased. Following a distillation through a 6″ open column, the product was redistilled through a 6″ column packed with Fenske rings. A yield of 8.6 parts (15.4% of the theoretical amount) of ethyl 2,4-dimethoxybicyclo(4.1.0)hepta-2,4-diene-7-carboxylate, a fragrant yellow oil boiling between 114.5° C./0.15 mm. and 122.5° C./1.25 mm. was obtained The refractive index of this product was $n_D^{25}$ 1.5152. This compound can be represented by the following formula:

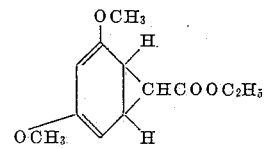

*Anal.*—Calc'd. for $C_{12}H_{16}O_4$: C, 64.25%; H, 7.17%. Found: C, 63.44%; H, 7.28%.

Example V

To 73.5 parts (0.5 mole) of alpha-methoxynaphthalene containing approximately 50 mg. of hydroquinone, there was added at room temperature 28.5 parts (0.25 mole) of ethyl diazoacetate. Very little nitrogen was evolved until the temperature had been raised to 145° C., at which point the reaction became moderately exothermic. During the time of addition (48 minutes) and for 25 minutes following, the temperature was maintained between 140 and 145° C. Heating was continued at 155–165° C. for 25 additional minutes until the evolution of the nitrogen had ceased. After purification of the product by distillation as described in Example IV, 11 parts (18.1% of the theoretical amount) of ethyl 3-methoxy-1a,7b-dihydro-1-cyclopropa[a]-naphthalene-1-carboxylate, a yellowish oil boiling between 135° and 144° C./0.07 mm. was obtained. This compound is a derivative of the generic bicyclo structure given on page 2 and may also be named ethyl 4-methoxybenzo(b)-bicyclo(4.1.0)hepta-2,4-diene-7-carboxylate. Determination of refractive index on this product gave a value of $n_D^{25}$ 1.5641. This compound can be represented by the following formula:

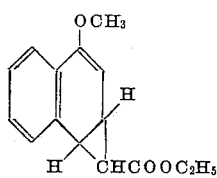

*Anal.*—Calc'd. for $C_{15}H_{16}O_3$: C, 73.70%; H, 6.59%. Found: C, 71.92%, 71.56%; H, 7.08%, 6.78%.

Example VI (A) The procedure of Example II was repeated essentially as described, using 91.5 parts (0.75 mole) of phenetole in place of anisole with 28.5 parts (0.25 mole) of ethyl diazoacetate. The reaction temperature was allowed to rise as high as 160° C. and, as the reaction proceeded, nitrogen was evolved vigorously. The ethyl 3-ethoxybicyclo-(4.1.0)hepta-2,4-diene-7-carboxylate was obtained in 17.2% yields as a yellow oil boiling at 91–99.5° C./0.3–1.38 mm. and having a refractive index of $n_D^{25}$ 1.5068. This compound can be represented by the following formula:

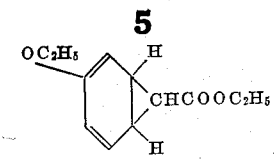

(B) Higher alkyl esters can also be prepared by the general procedures described above. For example, 2-ethylhexyl 3-methoxybicyclo(4.1.0)-hepta-2,4-diene-7-carboxylate was obtained by the procedure described under Example II through replacement of the ethyl diazoacetate with 2-ethylhexyl diazoacetate. This ester, obtained in 17.4% yield as a yellow oil distilled at 146–156° C./0.75 mm. and possessed a refractive index of $n_D^{25}$ 1.4871. This compound can be represented by the following formula:

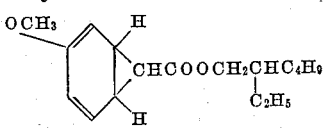

Anal.—Calc'd. for $C_{17}H_{26}O_3$: C, 73.25%; H, 9.40%. Found: C, 72.23%, 72.53%; H, 9.95%, 10.04%.

(C) Similarly, the butyl ester of 3-methoxy-bicyclo(4.1.0)hepta-2,4-diene-7-carboxylic acid was prepared by the procedure of Example II at a temperature of 129–134° C. during a reaction period of about 4 hours, employing butyl diazoacetate instead of the ethyl diazoacetate. The purified ester consisted of 11.2 parts of straw-colored oil boiling between 113.5° C./0.14 mm. and 129° C./0.149 mm. This compound can be represented by the following formula:

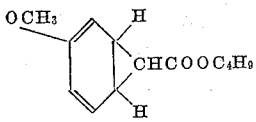

Anal.—Calc'd. for $C_{13}H_{18}O_3$: C, 70.3%; H, 8.1%. Found: C, 68.79%, 68.98%; H, 8.14%, 8.21%.

It is to be understood that both the 2- and 3-oxy-substituted bicyclo(4.1.0)hexa-2,4-diene carboxylic esters, as well as mixtures of the two position isomers which are possible, are meant to be included within the scope of this invention.

The phenolic-oxy compounds used to prepare the new compounds of this invention can be represented by the general formula $Ar(O-R)_n$, wherein $n$ is one to three, but preferably one to two, R is hydrogen and alkyl groups, preferably of up to 6 carbon atoms, e. g., methyl, ethyl, propyl, isopropyl, butyl, isobutyl, tertiary-butyl, n-amyl, isoamyl, n-hexyl, etc., and Ar is an aryl group in which such oxy-substituted aryl ring also contains at least two nuclear vicinal carbon atoms bearing hydrogen. Although the aryl group can be of one or more carbocyclic rings, it is preferred to use those of the benzene, naphthalene, phenanthrene, and anthracene class and, still more preferably, those of the benzene and naphthalene class, since the phenolic-oxy compounds of this type give the most useful fused, oxy-substituted, carbocyclic compounds. The aryl groups can also contain other substituents, preferably neutral substituents, e. g., hydrocarbon radicals, preferably alkyl radicals of 1 to 6 carbon atoms, such as methyl, ethyl, tertiary-butyl, amyl, hexyl, etc.; halogen such as fluorine, chlorine, and bromine. Examples of these aryl groups include phenyl, tolyl, xylyl, chlorophenyl, bromophenyl, fluorophenyl, naphthyl, chloronaphthyl, alpha-methylnaphthyl, beta-methylnaphthyl, phenanthryl, anthracyl, and the like.

By suitably reacting, in accordance with the general procedures of the illustrative examples, a diazoacetic ester, e. g., ethyl diazoacetate, with such phenolic-oxy compounds as 1-hydroxy-4-chlorobenzene, 1-hydroxy-4-bromobenzene, 1-hydroxy-2-methylbenzene, 1-hydroxy-3-methylbenzene, 1-hydroxy-4-methylbenzene, 1-hydroxy-4-tertiary-butylbenzene, 1,2-dihydroxybenzene, 1,3-dihydroxybenzene, 1,4-dihydroxybenzene, 1,3-dihydroxy-4-methylbenzene, 1,2,3-trihydroxybenzene, 2-hydroxy-1-chloronaphthalene, 2,6-dihydroxynaphthalene, 1-hydroxyphenanthrene, 1-hydroxyanthracene, n-propoxybenzene, n-butoxy-benzene, 1-methoxy-4-bromobenzene, 1-methoxy-4-fluorobenzene, 1-ethoxy-2-bromobenzene, 1-methoxy-4-methylbenzene, 1-methoxy-2,4-dimethylbenzene, 1-methoxy-2,5-dimethylbenzene, 1,2,3-trimethoxybenzene, 2-methoxy-1-chloronaphthalene, 2,5-dimethoxynaphthalene, 2-methoxyphenanthrene, 4-methoxy-phenanthrene, 2-methoxyanthracene, other new fused, oxy-substituted, carbocyclic compounds of the invention aside from those already recited can be obtained. For example, from ethyl diazoacetate and 1-methoxy-4-methylbenzene, ethyl 5-methyl-2-methoxy-bicyclo(4.1.0)hepta-2,4-diene-7-carboxylate is obtained. Others which can be obtained include ethyl 5-amyl-2-methoxy-bicyclo(4.1.0)hepta-2,4-diene-7-carboxylate, ethyl 3-n-hexoxy-bicyclo(4.1.0)-hepta-2,4-diene-7-carboxylate, and the like.

The cyclopropane substituents, i. e., those attached directly through carbon at the 7-position of the cyclo-hepta-2,4-diene ring as designated herein, which fall within the scope of the invention, are hydrolyzable to the carboxyl group and include carboxylic esters, amides, halides, anhydrides, salts, and the nitrile, aside from carboxyl. The alkyl carboxylic esters of up to 12 carbon atoms are preferred since they are the most readily accessible.

New fused, oxy-substituted, carbocyclic compounds containing these cyclopropane substituents at the above designated position can be obtained in accordance with the following scheme of well-known reactions:

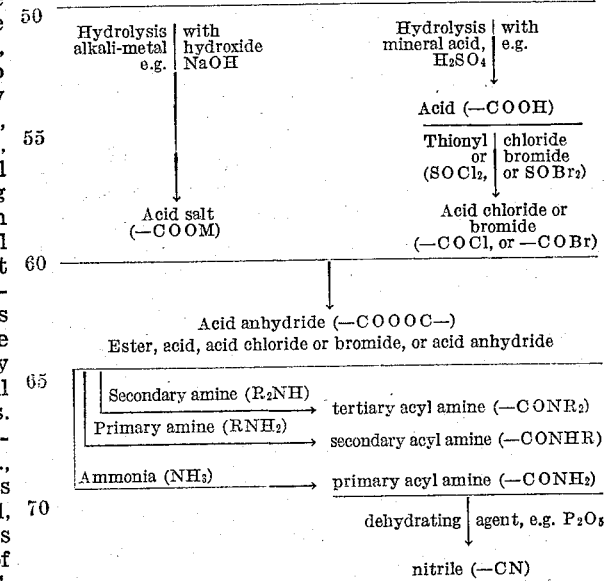

R is a monovalent saturated hydrocarbon radical; M is an alkali metal.

The diazoacetic esters suitably employed in the process of this invention have the general formula $N_2$—CH—COOR, wherein R is a monovalent saturated hydrocarbon radical of the acyclic and alicyclic series, preferably alkyl of up to 12 carbon atoms. Examples of such radicals include methyl, ethyl, propyl, isopropyl, n-butyl, isobutyl, amyl, hexyl, cyclohexyl, octyl, dodecyl, etc.

In the process of this invention the molal ratio of phenolic-oxy compound to diazoacetic ester may vary from 1:1 to 20:1. Preferably, there should be a molal excess of the phenolic-oxy compound. The molal ratio most preferred is that within the range of 2:1 to 6:1 since, in general, with these ratios of phenolic-oxy compound to diazoacetic ester, the reaction proceeds with less side reaction by-products.

The reaction is usually carried out at a temperature where nitrogen is evolved freely and can be from 20 to 30° C. below the decomposition point of the reactants or reaction products. In practice, a temperature of 80 to 180° C. is preferred. The time of reaction depends upon the temperature and may vary from 1 to as much as 24 hours depending, to a large extent, on the completion of nitrogen evolution. Ordinarily, at the preferred temperature range, 3 to 5 hours reaction time is sufficient for optimum results.

The new, fused, oxy-substituted, carbocyclic compounds of the invention which, in general, are viscous, oily, light-colored liquids of pleasant odors, include mixtures of cis-trans isomers and also position isomers, i. e., mixtures of position isomers wherein the two common annular carbon atoms of the cyclopropane ring and the oxy-cyclohexadiene ring are either in an ortho-meta, or meta-para position relative to an oxy-substituent as herein defined.

The new compounds of this invention are useful for various commercial purposes. They may be used as plasticizers, as intermediates for pharmaceuticals, and in perfume, bactericidal and insecticidal compositions. The products of Examples I and III, when sprayed as 2% acetone solutions effected 100 and 92% kill, respectively, against red spiders. Some of these products are also useful as insect paralyzants, especially toward houseflies and mosquitoes. For example, the product of Example II, when sprayed in 1% concentration in an acetone-kerosene (Deobase) solution (9 parts–1 part, by volume) against houseflies, paralyzes 83% of the flies in 10 minutes. A similar test against cockroaches paralyzes 55% in the same time.

As many apparently widely different embodiments of this invention may be made without departing from the spirit and scope thereof, it is to be understood that this invention is not limited to the specific embodiments thereof except as defined in the appended claims.

I claim:

1. An ester of a fused ring carbocyclic compound consisting of a cyclopropane ring fused with an oxy-substituted cyclohexadiene ring having a four-carbon atom conjugated diene system, said ester having the following structural formula

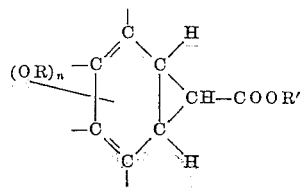

wherein OR is selected from the class consisting of the hydroxyl group and alkoxy groups of from 1 to 6 carbon atoms, $n$ is an integer from 1 to 2 inclusive, each OR group is directly attached through the oxygen thereof to an annular carbon atom of the four-carbon atom conjugated diene system of said cyclohexadiene ring, R' is a saturated monovalent hydrocarbon radical of from 1 to 12 carbon atoms, at least one of the annular carbon atoms of the four-carbon atom conjugated diene system of said cyclohexadiene ring is directly attached to a hydrogen atom and any remaining annular carbon atoms of the four-carbon atom conjugated diene system of said cyclohexadiene ring are each directly attached to a member selected from the class consisting of hydrogen, halogen, alkyl radicals of from 1 to 6 carbon atoms and a divalent four-carbon atom conjugated diene radical having terminal valences which are directly attached to adjacent doubly-bonded annular carbon atoms of said cyclohexadiene ring.

2. An ester of a fused ring carbocyclic compound consisting of a cyclopropane ring fused with an oxy-substituted cyclohexadiene ring having a four-carbon atom conjugated diene system, said ester having the following structural formula

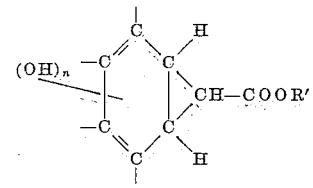

wherein $n$ is an integer from 1 to 2 inclusive, each OH group is directly attached through the oxygen thereof to an annular carbon atom of the four-carbon atom conjugated diene system of said cyclohexadiene ring, R' is a saturated monovalent hydrocarbon radical of from 1 to 12 carbon atoms, and the remaining annular carbon atoms of the four-carbon atom conjugated diene system of said cyclohexadiene ring are each directly attached to a hydrogen atom.

3. An ester of a fused ring carbocyclic compound consisting of a cyclopropane ring fused with an oxy-substituted cyclohexadiene ring having a four-carbon atom conjugated diene system, said ester having the following structural formula

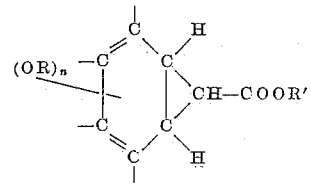

wherein OR is an alkoxy radical of from 1 to 6 carbon atoms, $n$ is an integer from 1 to 2 inclusive, each OR group is directly attached through the oxygen thereof to an annular carbon atom of the four-carbon atom conjugated diene system of said cyclohexadiene ring, R' is a saturated monovalent hydrocarbon radical of from 1 to 12 carbon atoms and the remaining annular carbon atoms of the four-carbon atom conjugated diene system of said cyclohexadiene ring are each directly attached to a hydrogen atom.

4. An ester of a fused ring carbocyclic compound consisting of a cyclopropane ring fused with an oxy-substituted cyclohexadiene ring having a four-carbon atom conjugated diene system, said ester having the following structural formula

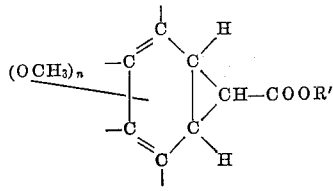

wherein $n$ is an integer from 1 to 2 inclusive, each OCH₃ group is directly attached through the oxygen thereof to an annular carbon atom of the four-carbon atom conjugated diene system of said cyclohexadiene ring, R' is a saturated monovalent hydrocarbon radical of from 1 to 12 carbon atoms and the remaining annular carbon atoms of the four-carbon atom conjugated diene system of said cyclohexadiene ring are each directly attached to a hydrogen atom.

5. An ester of a fused ring carbocyclic compound consisting of a cyclopropane ring fused with an oxy-substituted cyclohexadiene ring having a four-carbon atom conjugated diene system, said ester having the following structural formula

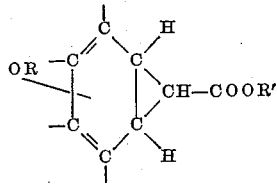

wherein OR is an alkoxy radical of from 1 to 6 carbon atoms, the OR group is directly attached through the oxygen thereof to an annular carbon atom of the four-carbon atom conjugated diene system of said cyclohexadiene ring, R' is a saturated monovalent hydrocarbon radical of from 1 to 12 carbon atoms, one of the annular carbon atoms of the four-carbon atom conjugated diene system of said cyclohexadiene ring is directly attached to a hydrogen atom and the remaining annular carbon atoms of the four-carbon atom conjugated diene system of said cyclohexadiene ring are directly attached to a divalent four-carbon atom conjugated diene radical having terminal valences which are directly attached to adjacent doubly-bonded annular carbon atoms of said cyclohexadiene ring.

6. An ester of a fused ring carbocyclic compound consisting of a cyclopropane ring fused with an oxy-substituted cyclohexadiene ring having a four-carbon atom conjugated diene system, said ester having the following structural formula

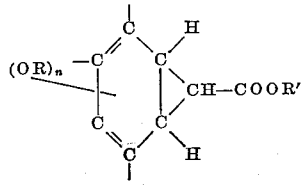

wherein OR is an alkoxy radical of from 1 to 6 carbon atoms, $n$ is an integer from 1 to 2 inclusive, each OR group is directly attached through the oxygen thereof to an annular carbon atom of the four-carbon atom conjugated diene system of said cyclohexadine ring, R' is a saturated monovalent hydrocarbon radical of from 1 to 12 carbon atoms, at least one of the annular carbon atoms of the four-carbon atom conjugated diene system of said cyclohexadiene ring is directly attached to a hydrogen atom and any remaining annular carbon atoms of the four-carbon atom conjugated diene system of said cyclohexadiene ring are each directly attached to an alkyl radical of from 1 to 6 carbon atoms.

7. An ester of a fused ring carbocyclic compound consisting of a cyclopropane ring fused with an oxy-substituted cyclohexadiene ring having a four-carbon atom conjugated diene system, said ester having the following structural formula

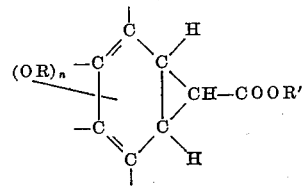

wherein OR is an alkoxy radical of from 1 to 6 carbon atoms, $n$ is an integer from 1 to 2 inclusive, each OR group is directly attached through the oxygen thereof to an annular carbon atom of the four-carbon atom conjugated diene system of said cyclohexadiene ring, R' is a saturated monovalent hydrocarbon radical of from 1 to 12 carbon atoms, at least one of the annular carbon atoms of the four-carbon atom conjugated diene system of said cyclohexadiene ring is directly attached to a hydrogen atom and any remaining annular carbon atoms of the four-carbon atom conjugated diene system of said cyclohexadiene ring are each directly attached to chlorine.

8. The chemical compound, ethyl 3-hydroxy-bicyclo-(4.1.0) hepta-2,4-diene-7-carboxylate.

9. The chemical compound, ethyl 3-methoxy-bicyclo-(4.1.0) hepta-2,4-diene-7-carboxylate.

10. The chemical compound, ethyl 4-methoxy-benzo(b) - bicyclo(4.1.0) hepta-2,4-diene-7-carboxylate.

NORMAN E. SEARLE.

REFERENCES CITED

The following references are of record in the file of this patent:

Brarer et al.: Berichte Deut. Chem. vol. 34, p. 982 (1901).

Calcagni, Gazz. Chim. Ital., vol. 44II, pp. 447–455 (1914).

Calcagni, Gazz. Chim. Ital., vol. 45II, pp. 362–368 (1915).

Guha et al.: Chemical Abstracts, vol. 34, p. 2822⁴ (1940).

Drake et al.: J. Organic Chemistry, vol. 11, pp. 67–74 (1946).

Buchner et al.: Berichte Deut. Chem., vol 36, pp. 3502–3507.